United States Patent [19]

Graham et al.

[11] 4,336,842

[45] Jun. 29, 1982

[54] METHOD OF TREATING WELLS USING RESIN-COATED PARTICLES

[76] Inventors: John W. Graham, Rte. 5, Box 289, Alvin, Tex. 77511; A. Richard Sinclair, 2903 Virginia, Houston, Tex. 77098; John L. Brandt, 812 Highwoods Trail, Fort Worth, Tex. 76112

[21] Appl. No.: 222,292

[22] Filed: Jan. 5, 1981

[51] Int. Cl.³ ...................... E21B 43/04; E21B 43/267
[52] U.S. Cl. .................................... 166/276; 166/280; 166/295
[58] Field of Search ............... 166/276, 280, 295, 308; 405/264

[56] References Cited

U.S. PATENT DOCUMENTS

| | | | |
|---|---|---|---|
| 2,348,484 | 5/1944 | Lawton | 166/295 |
| 2,900,027 | 8/1959 | Cooper | 166/295 X |
| 2,986,538 | 5/1961 | Nesbitt et al. | 166/295 X |
| 3,026,938 | 3/1962 | Huitt et al. | 166/280 |
| 3,134,436 | 5/1964 | Means et al. | 166/295 |
| 3,419,073 | 12/1968 | Brooks, Jr. | 166/295 |
| 3,476,189 | 11/1969 | Bezemer et al. | 166/295 |
| 3,612,181 | 10/1971 | Brooks, Jr. | 166/295 |
| 3,929,191 | 12/1975 | Graham et al. | 166/295 X |
| 4,127,173 | 11/1978 | Watkins et al. | 166/276 |

*Primary Examiner*—Stephen J. Novosad
*Assistant Examiner*—George A. Suchfield

[57] ABSTRACT

Particles coated with a fusible thermosetting resin are placed in the vicinity of a wellbore and in conjunction with a subterranean formation surrounding the wellbore and are cured in the presence of a treating solution containing a softening agent capable of reducing the fusion temperature of the resin.

12 Claims, No Drawings

METHOD OF TREATING WELLS USING RESIN-COATED PARTICLES

BACKGROUND OF THE INVENTION

1. Field of the Invention

This invention relates to the treatment of subterranean, hydrocarbon-bearing formations. In one aspect, it relates to an improved well treatment method which employs resin-coated particulate material.

2. Description of the Prior Art

In the completion and operation of oil wells, gas wells, water wells, injection wells, and similar boreholes, it frequently is desirable to alter the producing characteristics of the formation by treating the well. Many such treatments involve the use of particulate material. For example, in hydraulic fracturing, particles (propping agent) are used to maintain the fracture in a propped condition. Also, in sand control techniques, particulate material is placed in the well to prevent the influx or incursion of formation sand or particles.

Particulate material in the form of silica sand and gravel have long been used in hydraulic fracturing treatments and gravel pack completions, and because of their low cost and availability remain the most common materials used in such operations. Recognizing the deficiencies of sand and gravel in certain types of treatments, the industry has recently introduced a variety of improved particulates. One such material is resin-coated particles disclosed in U.S. Pat. No. 3,929,191 issued in the name of John W. Graham et al. According to the method described in this patent, particles coated with a fusible thermosetting resin are placed in the well (either in the fracture or around the wellbore opposite the producing formation) and permitting to cure. The resin at formation temperature fuses (i.e. softens) and then cures to a solid infusible condition. The softening of the resin causes the coatings of contiguous particles to fuse together such that upon curing the particles are bonded together. This produces a strong, consolidated and permeable framework for conducting formation fluids.

Resin-coated particles have proven successful as proppants and as a gravel packing medium. One problem associated with this material however, is the temperature dependence of the resin compressive strength. Some resins do not cure at temperatures below 130° F. or slowly at temperatures below 200° F. This means that at low reservoir temperatures, resin-coated sand cannot be cured or excessive set time may be required to attain satisfactory compressive strength. In some well operations, long down times are expensive or undesirable from an operational point of view.

SUMMARY OF THE INVENTION

Surprisingly, it has been found that by curing the packed resin-coated sand in a solution of a resin softening agent, the curing process can be accelerated and in some instances improved. Suitable softening agents include certain alcohols and nonionic surfactants. As used herein, a resin softening agent is a material that reduces the temperature at which the resin fuses (e.g. softens) permitting resin coatings of contiguous particles to bond together.

The preferred curing solution is an aqueous solution of a mixture of alcohol and nonionic surfactant. The alcohol should be at least partially soluble in the uncured resin. Suitable alcohols include isopropanol, methanol, or ethanol. The nonionic surfactants should have HLB's in the range between 8 and 18. Preferred surfactants are ethoxylated secondary alcohols with chain lengths of 11 to 15 carbon atoms.

While the mechanism responsible for the improved results obtained with the resin softening agents is not clearly understood, it is believed that the alcohol and/or surfactant in the curing solution causes the resin to fuse at a lower temperature than normal. Thus in low temperature wells, the resin in the presence of the softening agent is capable of softening and curing at temperatures which previously were believed to be unsuitable for the resin-coated particle treatment. Moreover, the softening creates larger fused areas at point contacts, thereby increasing the compressive strength.

The curing solution may be used as a carrier fluid for the resin-coated particles but preferably is injected as an overflush fluid after the resin-coated particles are placed in the well but before curing has occurred.

It is preferred that during curing of the propping agent, the packed particles be exposed to an overburden compression to attain maximum strength.

In its broadest form, the well treating method according to the present invention comprises the sequential steps of (a) placing the resin-coated particles at the desired location in the well, (b) curing the resin-coated particles in a solution containing an effective amount of resin softening agent to an infusible condition. The amount of resin softening agent will depend on several factors. With alcohol in an aqueous solution, concentrations from 5 to 20 volume percent are satisfactory with 10–15% range being preferred. With nonionic surfactants, solution concentration between ½ to 5 vol % is satisfactory. With the mixture of alcohol and nonionic surfactant the concentrations may vary within wide range depending upon their effectiveness but the preferred ranges are as follows:

| Alcohol | ½–20% |
| Nonionic Surfactant | ½–5% |
| Water and Other Additives | balance |

It is preferred that the solution contain at least 1 vol % of the alcohol and the nonionic surfactant.

DESCRIPTION OF THE PREFERRED EMBODIMENTS

As mentioned previously, the present invention provides for a method for effectively treating fusible resin-coated particles placed in a well to accelerate and/or improve the consolidation strength of the resin upon curing. The method employs two essential materials: (1) resin-coated particles and (2) a curing solution.

Resin-Coated Particles

The resin-coated particles may be those described in U.S. Pat. No. 3,929,191. The preferred material employed in the method of the present invention is a one-step, alkaline-catalyzed, phenolic resin. This type of resin is frequently referred to as a resole type phenolic resin, or an A-stage phenolic resin. The distinguishing characteristic of the one-step resin is that the resin is soluble in certain solvents, fusible and curable by the application of heat alone, and requires no additional catalyst or curing agent.

The one-step phenolic resins are prepared by reacting phenol with aldehydes in the presence of alkaline catalysts such as inorganic hydroxides, quaternary ammonium hydroxide or tertiary amines. In addition to phenol, resorcinol, alkyl substituted phenols such as cresol, and p-tert.-butylphenol, p-phenolphenol, and Cardanol may also be used. The aldehyde is normally formaldehyde but acetaldehyde and furfuraldehyde are also used. The one step phenolic resins may be prepared by reacting phenol and formaldehyde in a mole ratio of between about 1:1 and about 1:1.5 at a pH above about 7. As the materials react, the average molecular weight of the resin increases. By cooling, the rate of reaction may be slowed and stopped to form a solid, partially polymerized resin which is soluble in organic solvents and is fusible. This solid, one-step, thermosetting resin is commercially available in powder form.

For use in well treatments, it is preferred that the fusible resin be applied as a coating to a particulate substrate. The particulate material may be coated by dissolving powdered resin in a suitable solvent, mixing the resulting solution with the particles, and finally evaporating the solvent. The final product is a composite material consisting of a substrate and an encapsulating coating of a solid resin. This particulate material is characterized as free flowing and can be stored for relatively long periods of time at surface temperatures without appreciable agglomeration. A hot coating process may also be used. This technique involves preheating the substrate to several hundred degrees Fahrenheit, slowly adding a fusible resin to the substrate; mixing the substrate and the resin until the resin melts and completely coats the individual particles; and finally cooling the coated particles to return the resin to the solid state.

Regardless of the coating process, it is preferred that the system include an organosilicon compound to improve the bond between the substrate and resin. For phenolic resins, the preferred coupling agent is an organo-functional silane such as aminoalkylsilane. A silane that has given excellent results with phenolic resins is gamma-aminopropyltriethyoxysilane. For epoxy resins, suitable coupling agents include apoxyalkylsilane esters such as beta-93,4-epoxycyclohexyl) ethyltrimethoxysilane. The effect of coupling agents with resins are well known in the art and are described at length in the literature. The most effective coupling agent for a particular system may be selected on the basis of published literature.

Although the substrate for the resin may be any particulate material capable of being coated, the preferred material because of its low cost, is silica sand. The amount of resin coating may be relatively small. However, best results are obtained with coatings between about 3 and 8 weight percent based on the total coated particle weight.

Curing Solution

The curing solution contains a resin-softening agent capable of lowering the fusion temperature of the resin.

The resin softening agents that have proven successful include (a) alcohols at least partially soluble in the resin and (b) nonionic surfactants.

A wide variety of alcohols are soluble in resins useful in the present invention. The preferred alcohols, however, are isopropanol, methanol, and ethanol. The concentration of the alcohol will depend upon its solubility in the resin selected for the treatment. It should be present in sufficient concentration in the curing solution to reduce the fusion temperature (i.e. softening temperature) by at least 20° F. With phenol-formaldehyde resins, alcohol (methanol) concentrations of 5 to 20 vol % (preferably 10-15 vol %) have given satisfactory results.

The surface active agents suitable for the present invention must be partially soluble or dispersible in a carrier fluid and be capable of lowering the fusion temperature of the resin. Suitable surfactants for phenol formaldehyde resins and brine carrier fluid include water soluble nonionic surfactants having HLB numbers greater than about 8, and preferably greater than about 10. Nonionic ethoxylated secondary alcohols with chain lengths between $C_{11}$ and $C_{15}$ have proven particularly effective. Such surfactants are sold by Union Carbide under trade name Tergitol Nonionic Surfactants.

The concentration of the surfactant of course will depend upon the resin selected, but should be capable of lowering its fusion temperature by at least 20° F. With phenol formaldehyde resins, concentration in an aqueous solution of between ½ and 5 volume % has given satisfactory results.

Best results have been obtained with a mixture of the above alcohols and nonionic surfactants in the curing solution. There appears to be a synergistic effect with both present. With phenol formaldehyde resins, the following concentrations of alcohol and nonionic surfactants in aqueous solutions are preferred:

| COMPONENT | SOLUTION (brine) CONCENTRATION (vol %) |
|---|---|
| Alcohol (Methanol) | ½-20% |
| Surfactant (nonionic ethoxylated secondary alcohols sold as Tergitol 15-S-9) | ½-5% |

A concentrate containing the desired amount of alcohol and surfactant may be prepackaged and used at the well site to prepare the treating solution. These concentrate packages include 5 gallons of a 50-50 mixture of the alcohol and surfactant.

For purposes, of illustration, the invention will be described in connection with two preferred embodiments—hydraulic fracturing and gravel pack completions.

HYDRAULIC FRACTURING

Propping agents used in hydraulic fracturing normally range in particle size from about 6 to about 100 mesh with the most common range being between 10-40 mesh. Parenthetically, it should be noted at this point that any reference to mesh herein is to the U.S. Standard Sieve Series. Sand is by far the most common propping agent currently used because of its low cost and great abundance.

The particles, coated with the fusible, thermosetting resin, may be stored and handled using conventional fracturing equipment and techniques. Some precautions, however, should be taken to insure that the storage temperature is maintained at moderate levels.

In carrying out the fracturing method, a fracture is first generated by injecting a viscous fluid into the formation at sufficient rate and pressure to cause the formation to fail in tension. Earth stresses normally are such to result in a vertical fracture. Injection of the fluid is continued until a fracture of the desired geometry is obtained. A carrier fluid, preferably salt water or hydrocarbon liquid (such as diesel oil) having the proppant suspended therein is then pumped into the fracture.

It should be noted that the temperature of the carrier fluid during pumping operations will be low so as to prevent premature curing of the resin. The carrier fluid bleeds off into the formation and deposits the propping agent in the fracture.

Particle concentrations in the carrier fluid normally will be between 2 and 10 pounds per gallon to provide a multi-layer pack in the fracture.

In the preferred embodiment, the curing solution containing the softening agent is injected into the formation after the resin-coated particles have been placed in the fracture and the fracture allowed to close on the particles. The curing solution, which is injected at pressures below frac pressure, may be separated from the proppant carrier fluid by a suitable buffer fluid such as brine. The amount of afterflush may vary from about 10 gallons to 50 gallons per foot of formations and should be satisfactory for most wells.

The solution of resin softening agent contacts the solid uncured resin and causes the resin to soften. At the same time, ambient formation temperature heats the resin. Initially, the resin fuses (e.g., softens or melts) and unites at contact areas with the resin coating of contiguous particles or with the formation walls. As the temperature increases, the polymerization reaction proceeds until the resin is cured to an insoluble, infusible, cross-linked state. The pendular regions between adjacent particles bonds the packed particles into a permeable network having considerable compressive strength. In practice, the solution will probably not contact all the coated particles but will contact sufficient amounts to produce the desired results in the near wellbore region.

GRAVEL PACK COMPLETIONS

The composite material consisting of substrate and a resin coating may be used in a variety of sand control techniques involving the placement of a filter bed in surrounding relation to or within a wellbore. This contemplates open-hole gravel packs, inside gravel packs, and linerless gravel packs. In each of these completions, aggregate material is placed adjacent the formation and is sized to screen out or cause the formation sand entrained in the fluid to bridge. The particle size of the aggregate is selected in relation to the size of formation particles. The sizing may be by conventional techniques based upon core analysis data. As a general rule, however, the aggregate size will range between about 6 and about 120 mesh.

In carrying out linerless gravel pack completions the particles, suspended in a carrier fluid, are injected into the well and forced through the well casing perforations. Prior to the injection, it may be necessary to wash behind the perforations to provide sufficient cavity for receiving the particles. During particle placement, the carrier fluid bleeds off into the formation and deposits the resin-coated particles in the cavity previously formed. Following the injection of the gravel slurry, the curing solution containing the resin softening agent is injected. The softening agent contacts the resin causing it to soften. Following placement of the resin-coated particles and injection of the curing softening agent solution, the well is shut-in permitting the temperature to equalize in the well. Increase in temperature in the packed interval softens or melts the resin coating and then cures the resin to an infusible crosslinked state. The permeable network resulting from this treatment provides a self-sustaining, consolidated interval which prevents the aggregate from flowing through the perforations and entering the wellbore.

In either open-hole or inside gravel pack, a liner is lowered into the well on a tubing string and located opposite the formation. The resin-coated particles may be placed around the liner using conventional tools and techniques and permitted to cure in the manner described above.

LABORATORY EXPERIMENTS

Laboratory experiments were conducted to determine the effects of a resin softening agent on the compressive strength of sand coated with a thermosetting resin.

Four samples of resin-coated sand were obtained from Santrol Products, Inc. of Houston, Tex., under trade name of Super Sand. The particles used in the experiments included silica sand coated with 5 weight percent of a phenol formaldehyde resole type resin. The coated particles had a mesh size of 20-40. Each sample was placed in a 1" diameter×4" plastic container and cured for 22 hours under 0 psi pressure in the following fluids at 200° F.:

| Fluid | Brine (2% NaCl) Vol. % | Methanol Vol. % | Surfactant Vol. % |
| --- | --- | --- | --- |
| A | 100 | 0 | 0 |
| B | 85 | 15 | 0 |
| C | 99 | 0 | 1 |
| D | 84 | 15 | 1 |

The surfactant was a nonionic surfactant sold by Union Carbide under trade name of Tergitol 15-S-9.

The compressive strengths of the consolidated samples were then measured with a ram type platen press. The compressive load was increased in increments until the sample failed. The results are tabulated below.

| Sample | Compressive Strength, psi |
| --- | --- |
| A | 400 |
| B | 740 |
| C | 860 |
| D | 1420 |

The above test results clearly show the effect of the softening agents on compressive strength of the cured samples. While the samples (B and C) with only one of the softening agents gave improved results, the sample (D) with both softening agents gave best results.

Examination of the samples revealed that the samples cured in the presence of a softening agent had larger fused regions in the areas of particle contact and this is believed responsible for the improved results.

The present invention has been described with reference to specific materials and techniques. Variations, particularly in various types of softening agents capable of having the desired effect on the resin may be made without departing from the scope of the invention.

We claim:
1. A method of treating a subterranean formation surrounding a wellbore which comprises:
   (a) placing in contact with said formation particles coated with a solid termosetting resin capable of fusing and then curing to an infusible state; and

(b) curing said resin in a solution containing an agent capable of lowering the temperature at which said resin fuses.

2. The method defined in claim 1 wherein said agent is present in a concentration sufficient to lower the temperature at which said resin fuses by at least 20° F.

3. The method as defined in claim 1 wherein said solution is an aqueous solution of alcohol, said alcohol being present in a concentration of between about 5 and about 20 volume percent.

4. The method as defined in claim 1 wherein the solution is an aqueous solution of a nonionic surfactant, said surfactant being present in a concentration of at least one-half volume percent.

5. The method as defined in claim 4 wherein said surfactant has an HLB number between about 8 and about 18.

6. The method as defined in claim 5 wherein the surfactant is an ethoxylated secondary alcohol with chain length of 11 to 15 carbon atoms.

7. The method as defined in claim 1 wherein the solution is an aqueous solution comprising from about ½ to about 20 volume percent of alcohol and from about ½ to about 5 volume percent of a nonionic surfactant.

8. A method of gravel packing a subterranean formation surrounding a wellbore which comprises:
    placing particles coated with a solid thermosetting resin in said wellbore adjacent said formation; said resin being capable of fusing and curing to an infusible state; injecting an afterflush fluid into the resin coated particles adjacent said formation, said afterflush fluid containing an agent capable of lowering the temperature at which said resin fuses; and thereafter causing said resin to cure to an infusible state thereby bonding the particles together.

9. A method defined in claim 8 wherein the resin is a one-step resole type phenolic resin.

10. A method as defined in claim 8 wherein the afterflush fluid is an aqueous fluid containing at least ½ volume percent of an alcohol soluble in said resin and at least ½ volume percent of a nonionic surfactant.

11. A method of treating a subterranean formation surrounding a wellbore which comprises packing particles coated with a solid thermosetting resin capable of fusing and curing to an infusible state in contact with said formation; overflushing the particles packed in contact with sand formation with an aqueous solution containing from about ½ to about 20 volume percent of an alcohol soluble in said resin and from about ½ to about 5 volume percent of a nonionic surfactant, said alcohol and surfactant being capable of lowering the fusion temperature of the resin to cause said resin to fuse; and thereafter, curing said resin to an infusible state thereby bonding said particles together.

12. A method as defined in claim 11 wherein the resin is a one step phenolic resin and the aqueous solution contains at least 1 volume percent of said alcohol and at least one volume percent of said nonionic surfactant.

* * * * *